F. HEDLEY & J. S. DOYLE.
CAR CONTROL SYSTEM.
APPLICATION FILED JULY 15, 1912.
1,149,758.
Patented Aug. 10, 1915.
2 SHEETS—SHEET 2.
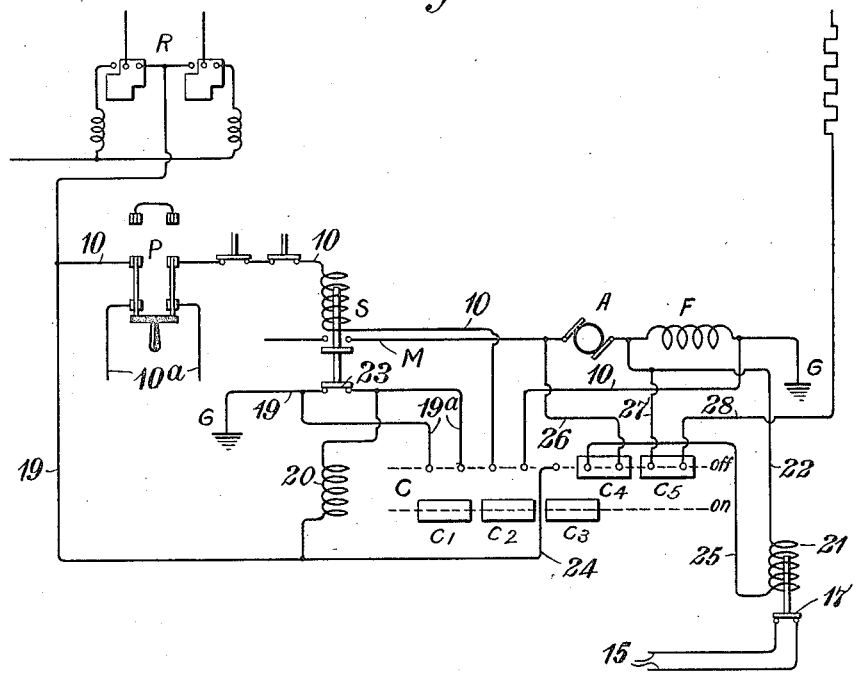
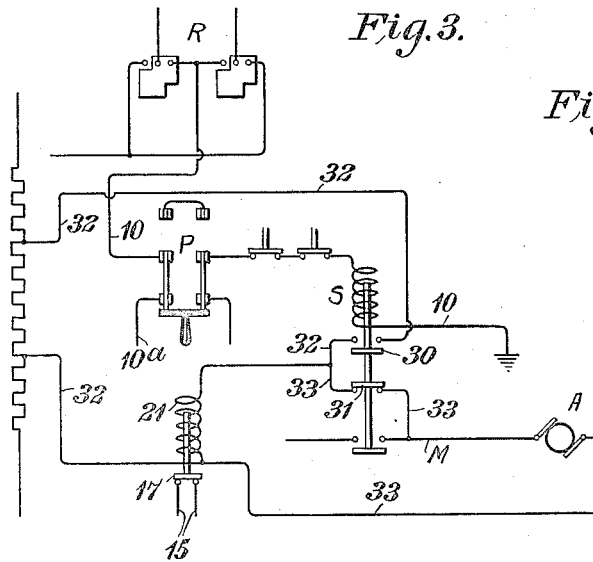
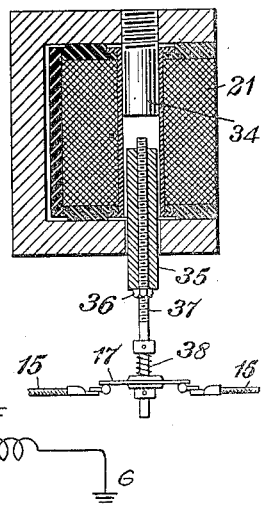
Witnesses:
C. L. Belcher
A. S. Fowler
Inventors
Frank Hedley
James S. Doyle
By Attorney
Edward A. Wright

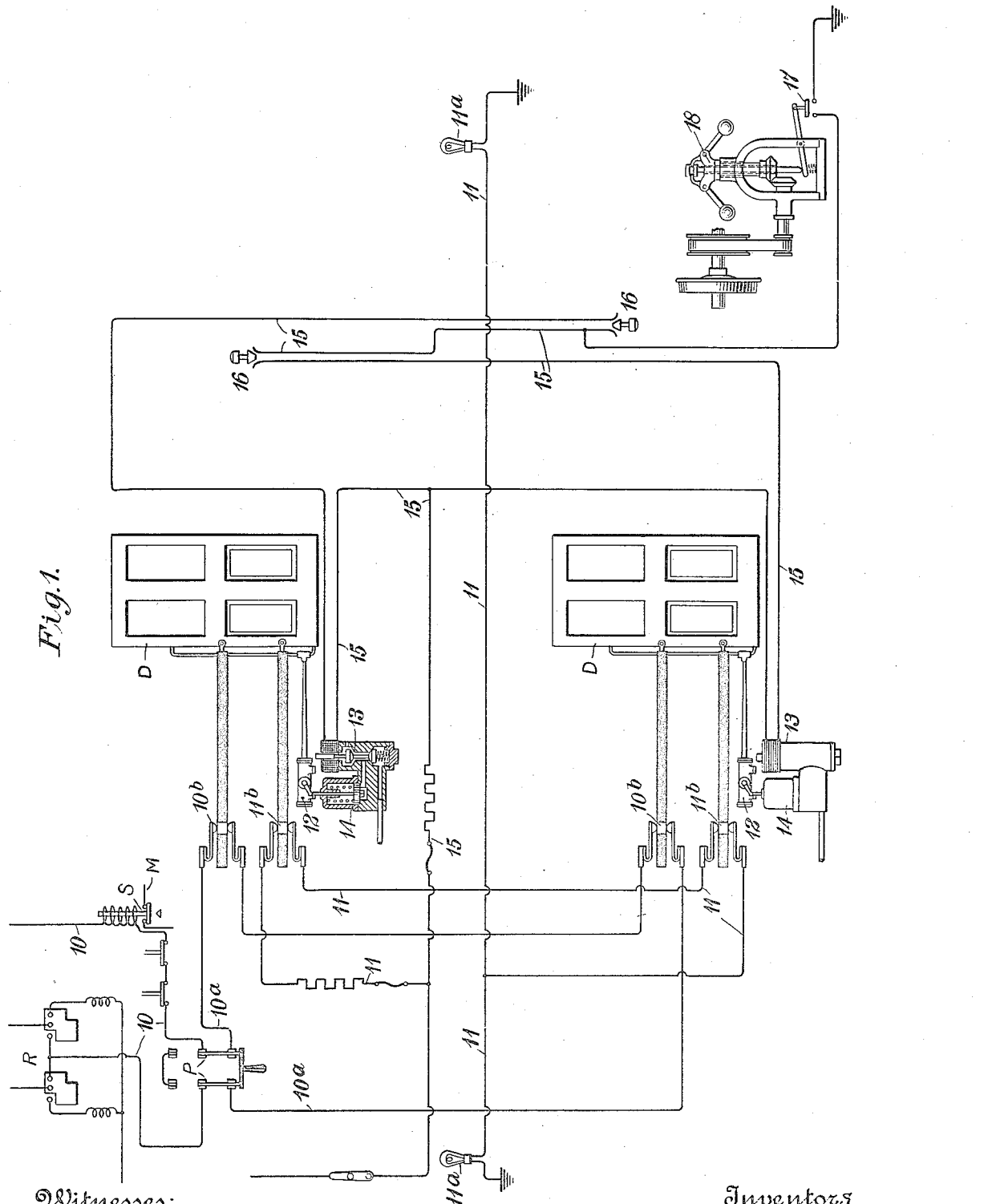

UNITED STATES PATENT OFFICE.

FRANK HEDLEY, OF YONKERS, AND JAMES S. DOYLE, OF MOUNT VERNON, NEW YORK.

CAR-CONTROL SYSTEM.

1,149,758. Specification of Letters Patent. Patented Aug. 10, 1915.

Application filed July 15, 1912. Serial No. 709,503.

*To all whom it may concern:*

Be it known that we, FRANK HEDLEY and JAMES S. DOYLE, both citizens of the United States, residing, respectively, at Yonkers and Mount Vernon, in the county of Westchester and State of New York, have invented a certain new and useful Improvement in Car-Control Systems, of which the following is a specification.

This invention relates to control systems for cars and more particularly to electrically propelled cars having doors adapted to be opened by the conductor or other person when the car stops to take on and discharge passengers, and to be closed before again starting the car.

One of the objects of our invention is to provide improved means under the control of the conductor for opening and closing the car doors.

Another object is to provide means governed by the movement of the car in running for controlling the operation of the car doors in such a manner that the doors cannot be opened while the car is running, but may be opened when the car comes to a stop, or when the speed is sufficiently reduced.

Another object is to provide means governed by the car doors for controlling the running of the car motors, so that when the car doors are open, the car motors cannot be started to run the car, but when closed, the car motors may be started and run in the usual way.

Another object is to provide means for controlling both a car control circuit and a signal circuit by the car doors in such a manner that after the car is stopped, the motorman is advised when the doors are opened, and may then place his controller in a running position so as to start the car the instant that the doors are closed, thereby saving time.

In the accompanying drawings: Figure 1 is a diagram illustrating a car control system embodying our improvement, and showing a centrifugal governor device driven from the car axle for controlling the door operating circuit; Fig. 2, a wiring diagram showing a modification for controlling the door operating circuit electrically; Fig. 3, a wiring diagram showing another modification for controlling the door operating circuit electrically; and Fig. 4, a detail view of a preferred form of switch, and solenoid or magnet for operating same.

Our improvement may be applied in connection with any electrically propelled car having doors adapted to be opened and closed by the conductor, and in the drawings, we have illustrated the same as employed upon a car having the well known unit switch control equipment of which R represents the reverser with the usual leads from the master controller and to the control resistance. Lead 10 also connects with the control circuit and contains the coil of the line switch S, which opens and closes the motor circuit M.

According to one of the features of our improvement, a circuit which controls the operation of the car motors is itself controlled by the car doors in such a manner that when the car doors are closed, the motors may be operated to run the car, but when the car doors are wholly or partly open, current cannot be supplied to the motors to run the car. In the particular equipment shown in the drawings, this is accomplished by inserting a double throw switch P, in the circuit, 10, and extending the control circuit by lead 10ª, from the poles of said switch to the car doors, D, where switches 10ᵇ are inserted in the circuit, 10ª, and arranged to open said circuit when the car doors are open, and to close the same when the car doors are closed. When the doors are closed and the controller is turned to its running positions, the control circuit, 10, 10ª, including the line switch coil, is energized, and the current may be supplied to the motors to run the car in the usual manner. When one or more of the car doors are open, however, the control circuit is broken and the line switch cannot be thrown to close the motor circuit. Therefore the car motors cannot be started to run the car until the doors are closed.

After the car has come to a stop and the doors are opened, instead of waiting for the doors to be closed and to receive a signal from the conductor, the motorman may immediately place his controller in the first running position, so that the car will start automatically as soon as the conductor closes the door. This effects a saving of time, and in order that the motorman may be advised as to the instant the doors are opened after coming to a stop, a signal circuit, 11, may be provided having switches, 11ᵇ, operated by the car doors, and lamps, 11ᵃ, at the ends of the car within sight of the motorman.

When the car is running with doors closed, the lamps are lighted and also after the car is stopped the lamps remain lighted until the doors are opened, then they go out which indicates to the motorman that the doors are open and he may safely place his controller on the first running position without danger of starting the car until the doors are closed.

For the purpose of operating the car doors fluid pressure motors, 12, may be provided having a valve for controlling the fluid pressure and actuated by an electric pneumatic valve device comprising the usual magnet valve, 13, and piston, 14, the coil of the magnet being located in the door control circuit, 15, having conductor switches, 16, one upon either side of the car. In the particular design shown in the drawings, the circuit is arranged for the conductor to be stationed upon the side of the car where the door remains closed and operate the switch, 16, upon that side to open and close the door upon the other side of the car, the other switch, 16, not in use, being open. Any other suitable or preferred arrangement of the door control circuit may, however, be employed.

When the conductor's switch, 16, is closed the magnet valve, 13, is energized and supplies air under pressure to piston, 14, to throw the valve of the door actuating motor, 12, and thereby open the door. When the switch, 16, is opened, the magnet is deenergized, thereby closing the supply port to piston, 14, and opening an exhaust port, whereupon the spring returns the piston, 14, and the valve of the door motor to normal closing position in which the motor operates to close the door, and hold the same closed.

In order to make it impossible for the conductor to open the door when the car is running, we provide means for controlling the door operating circuit, said means operating to hold the circuit open when the car is running, and to close the same when the car stops, or when the speed is reduced to a predetermined low degree. Such a means may comprise a switch, 17, located in the door operating circuit, 15, and a centrifugal governor device, 18, driven from the car axle, as shown in Fig. 1, and operating to hold the switch, 17, open when the car is running, but closing said switch when the car stops and the balls cease rotating, or when the speed is reduced to a desired point. The conductor will then be able to open the doors by closing his switch, 16, only when the car is stopped, or when the speed is reduced to a desired degree, since at all other times, when the car is running, the door control circuit is open at the switch, 17. This feature of our improvement is not limited to any particular form of device for preventing the opening of the doors when the car is running, as various constructions may be designed for this purpose. In Fig. 2, we have illustrated one such modification, in which the switch governing the door control circuit, is held open electrically during the time that the car is running.

According to the circuit connections shown in Fig. 2, there is a coil, 21, for operating the switch, 17, in the door control circuit, 15, and a change over switch, C is provided having a coil, 20, located in a branch circuit, 19, leading from the wire, 10, to the ground. When the controller is turned to a running position, current flows through circuit 19, including coil, 20, and interlock switch, 23, carried by the line switch, S, thereby energizing the coil and throwing the change over switch C to the "on" position in which the contact bars, $c^1$, $c^2$, $c^3$, engage the stationary contact fingers, and the bars, $c^4$ and $c^5$, move off leaving their terminals open. The bar, $c^2$, then closes the circuit, 10, of the line switch, S, provided circuit 10 is already closed through switch P, thereby closing the circuit, M, to the armature, A, and field F of the motor, thereby starting the car. The closing of the line switch S also opens the interlock, 23, but as the by pass circuit, 19ᵃ is at this time closed by contact bar $c^1$, the coil, 20, still remains energized and holds the change over switch in its "on" position. In this position of the change over switch, the bar, $c^3$, connects leads, 24 and 25, so that current flows through the coil, 21, and through field F, to ground, thereby holding the switch, 17, of the door control circuit open so as to prevent the possible opening of the car doors while the controller is on and the car is running.

When the controller is thrown off preparatory to stopping the car, it is manifest that the switch, 17, should still be held open until the car actually stops, or until the speed is sufficiently reduced, and for this purpose when the change over switch C, and the line switch S, return to their normal "off" positions, as they do when the controller is thrown off, the bar, $c^4$, on the change over switch C, closes a local circuit around the armature A through leads 26, 25, and 22, including coil, 21, of switch, 17. The armature now being driven by the momentum of the car operates to generate sufficient current in the local circuit to keep the coil, 21, energized and holds the switch, 17, of the door circuit, 15, open until the speed is sufficiently reduced or the car stops, whereupon the current diminishes or ceases to be generated and the switch 17, closes. If it should be desired to strengthen the field F of the motor at the time that it is being operated as a generator for the local circuit the change over switch may have a bar, $c^5$, connecting leads 27 and 28 in the "off" position whereby the field may be excited with a small amount of current from the line.

Still another modification is shown in Fig. 3, in which the change over switch is dispensed with and the coil, 21, is energized by current from the line when the controller is on, and by current in a local circuit around the motor armature when the controller is off and the motor is being driven by the momentum of the car. According to this construction, the line switch S is provided with two interlock switches, 30 and 31, one of which controls a shunt circuit around a portion of the controller resistance and the other controls the local circuit around the motor armature. The operation is as follows: When the controller is thrown on, the line switch S is thrown to close the motor circuit M, and the interlock switch 30 closes the shunt circuit, 32. The shunt circuit also includes the coil, 21, which is thereby energized holding the switch, 17, open. When the controller is thrown off, the line switch opens and at the same time opens the interlock switch 30 of the shunt circuit, and closes the interlock switch 31 of the local armature circuit, 33. This circuit also includes the coil, 21, which is thus energized by the current generated by the armature when driven by the momentum of the car, and the switch, 17, is thereby held open until the speed is sufficiently reduced or the car stops, as before described. It will be evident that any of these means which are governed by the movement of the car in running, for operating the switch in the door circuit, may be adjusted to hold the circuit open when the car is running at or above any predetermined speed, but adapted to close said circuit when the speed is reduced to a desired low degree, such as one or two miles per hour.

In Fig. 4 of the drawing is shown a preferred form of magnet or solenoid for operating the switch, 17, whereby the same may be adjusted to close at any desired predetermined speed of the car. The coil, 21, is provided with the fixed pole piece, 34, extending within the coil at one end, while the movable armature, 35, is mounted to slide within the opening in the coil at the other end. For the purpose of regulating the dropping out point of the armature an adjustable screw or other means may be provided between the end of the armature 35 and the pole piece 34 to vary the length of the air gap between the same. As shown in Fig. 4, a rod, 37, preferably of brass, is threaded through the armature 35 and projects above the upper end of same as indicated, the amount to which the rod projects being adjusted in any suitable manner, as for instance, by relatively turning the armature and rod and setting up the lock nut 36. The switch bar, 17, may be slidably mounted on the lower end of the rod, 37, and have a yielding spring, 38, bearing upon the same to provide for a slight relative movement between the rod and switch bar. The current generated in the coil, 21, by the motor armature when the same is being driven by the momentum of the car serves to hold the armature up within the coil with the screw rod, 37, in contact with the pole piece 34 and the switch 17 open. When the speed of the car has diminished to a sufficiently low point, such as one to two miles per hour, the pull of the magnet will no longer be strong enough to hold up the weight of the armature and the latter will then drop and close the switch, 17. By adjusting the rod, 37, in the armature, the air gap may be varied so that the armature will drop to close the switch 17 at any predetermined low speed as desired. While the coil, 21, is shown as operating a switch in the door control circuit, it will be evident that it could be employed in connection with any other form of an interlocking device which would prevent the opening of the car door when the car is running. It will also be understood that in actual practice, the usual switch operating unit comprising magnet valve, cylinder and piston, such as indicated in the door circuit in Fig. 1, may be used in place of any of the coils which are merely indicated diagrammatically in the drawings as a means for throwing a switch.

It will now be apparent that by means of our improved car control system, absolute safety is attained in the operation of the car, as the doors are positively held closed to prevent passengers from getting on or off the car while the same is running, and the conductor is powerless to open said doors until the speed is sufficiently reduced or the car comes to a stop. Then when the car is stopped the motorman cannot accidentally start the car while the passengers are getting on or off, but he may place his controller in the first running position when the doors are open without danger of starting the car at that time. The car will, however, then start automatically as soon as the doors are closed and considerable time will be saved in this manner.

Having now described our improvement, what we claim as new and desire to secure by Letters Patent is:—

1. The combination with a car door and mechanism for operating same, of means to prevent actuating said operating mechanism to open the door while the car is running.

2. The combination with a car door and mechanism for operating same, of means driven by the momentum of the car for preventing the actuation of the door operating mechanism to open the door.

3. The combination with a car door having a mechanism for operating said door, of means governed by the movement of the car in running for controlling said mechanism.

4. The combination with a car door having a motor for operating said door, of manually actuated means for controlling the operation of the motor, and means governed by the movement of the car in running for also controlling said motor.

5. The combination with a car door having a motor for operating said door, of manually actuated means for controlling the operation of the motor, and means automatically operating by the movement of the car in running to prevent the operation of said door motor.

6. The combination with a car door having a motor for operating said door, of a circuit for controlling said motor, and means governed by the movement of the car in running for opening said circuit.

7. The combination with a car door having a motor for operating said door, of a circuit for controlling said motor, a manually operated switch for said circuit, and means governed by the movement of the car in running for also controlling said circuit.

8. The combination with a car door having a motor for operating said door, of a circuit for controlling said motor, a conductor's switch and an automatic switch for said circuit, and means governed by the movement of the car in running for opening and closing said automatic switch.

9. The combination with a car door having a motor for operating said door, of a circuit for controlling the operation of said motor, means governed by the movement of the car in running for controlling said motor circuit, a car propelling motor, a circuit for controlling the car motor, and means operated by the movement of the door for controlling the latter circuit.

10. In an electric car control system, the combination with a car door and mechanism for operating the same to open and closed position, of means operating to prevent the actuation of said mechanism to open the door when the power is turned on for propelling the car.

11. In an electric car control system, the combination with a car door and mechanism for operating the same to open and closed positions, of means controlled by the current when the power is turned on, for preventing the actuation of said mechanism to open the door.

12. In an electric car control system, the combination with a car door, a motor for operating same and a circuit for controlling the operation of said motor, of a car propelling motor, and electro-magnetic means operated by line current when the power is turned on to the car propelling motor for maintaining the door operating motor circuit open.

13. In an electric car control system, the combination with a car door, a motor for operating same and a circuit for controlling the operation of said motor, of a switch for said circuit a car propelling motor, a power circuit therefor, and an electro-magnetic device actuated by current from the power control circuit for operating said switch.

14. In an electric car control system, the combination with a car door, a motor for operating same and a circuit for controlling the operation of said motor, of a car propelling motor, a circuit therefor, a control resistance in said circuit, and an electro-magnetic device located in a shunt circuit around the control resistance for controlling the door circuit.

15. In an electric car control system, the combination with a car door and mechanism for operating the same, of means controlled by the current when the power is turned on, for preventing the actuation of said mechanism to open the door, and means operated by the momentum of the car after the power is turned off, for also preventing the actuation of said mechanism to open the door.

16. In an electric car control system, the combination with a car door, a motor for operating same and a circuit for controlling the operation of said motor, of electro-magnetic means operated by line current when the power is turned on and by the counter electro-motive force of the motor armature after the power is turned off, for controlling the door circuit.

17. In an electric car control system, the combination with a car door, a motor for operating same and a circuit for controlling the operation of said motor, of an electro-magnetic device for controlling the door circuit, said device being actuated by the line current at one time and by the counter electro-motive force at another time, and means governed by the line switch for shifting the circuit connections.

18. In an electric car control system, the combination with a car door, a motor for operating same and a circuit for controlling the operation of said motor, of electro-magnetic means operated by the counter electromotive force of the motor armature for controlling the door circuit.

19. In an electric car control system, the combination with a car door, a motor for operating same and a circuit for controlling the operation of said motor, of electro-magnetic means operated by the counter electromotive force of the motor armature for controlling the door circuit, said magnetic means being adjustable to vary the point at which the circuit closes.

20. In an electric car control system, the combination with a car door, and mechanism for operating the same, of means operated by the momentum of the car for controlling said mechanism, said means being adjustable to vary the point at which the car door may be opened.

21. The combination with a car door, of a motor therefor, an electromagnetic controlling device for the motor, and a circuit breaker for said controlling device dependent on the movement of the car.

22. The combination with a car door, of a motor therefor, an electromagnetic controlling device for the motor and a circuit breaker for said controlling device dependent on the generator action of the motor which propels the car.

23. The combination with a car door, of a pneumatic motor therefor, a valve for said motor, a magnet for operating said valve, and a circuit breaker in the circuit of said magnet dependent on the car movement.

24. The combination with the door of an electrically propelled car, of a pneumatic motor for said door, a valve for said motor, a magnet for operating said valve, and a circuit breaker in the circuit of said magnet dependent on the generator action of the motor which propels the car.

25. The combination with a car door of an operating motor therefor, of an electrical controlling device for said motor dependent alternately on the trolley current and on the current from the car motor acting as a generator.

26. The combination with a car door of an operating device therefor, means for rendering said device inoperative while the car is moving, and means for placing said device under the control of the stopping movement of the car as the car is coming to rest.

27. The combination with a car door of a controlling magnet therefor energized by the propelling motor of the car acting as a generator when the car is driven by its own momentum.

In testimony whereof we have hereunto set our hands.

FRANK HEDLEY.
JAMES S. DOYLE.